United States Patent [19]

Velarde

[11] E Re. 30,196

[45] Reissued Jan. 22, 1980

[54] SINGLE PISTON OPERATED CLIP DEVICE

[75] Inventor: Clyde R. Velarde, Raleigh, N.C.

[73] Assignee: Rheem Manufacturing Company, New York, N.Y.

[21] Appl. No.: 940,520

[22] Filed: Sep. 7, 1978

Related U.S. Patent Documents

Reissue of:

[64] Patent No.: 4,004,339
Issued: Jan. 25, 1977
Appl. No.: 565,581
Filed: Apr. 7, 1975

[51] Int. Cl.[2] ..... B23P 11/00

[52] U.S. Cl. ..... 29/243.56; 29/243.57; 53/138 A

[58] Field of Search ..... 29/243.56, 243.57, 208 B, 29/208 D; 53/138 A, 138 R, 112 B; 83/519, 601, 605, 607, 608, 609

[56] References Cited

U.S. PATENT DOCUMENTS

| | | | |
|---|---|---|---|
| 2,780,285 | 2/1957 | Hudson | 83/601 |
| 2,880,419 | 4/1959 | Tipper | 29/243.57 |
| 3,004,458 | 10/1961 | Dvorak | 83/601 |
| 3,196,727 | 7/1965 | Pray | 83/601 |
| 3,279,033 | 10/1966 | Normand et al. | 29/32.5 |
| 3,377,692 | 4/1968 | Tipper | 29/243.57 |
| 3,381,359 | 5/1968 | Schroeder | 29/243.57 |
| 3,394,528 | 7/1968 | Tipper | 53/112 |
| 3,543,378 | 12/1970 | Klenz | 29/243.57 |
| 3,783,583 | 1/1974 | Dobbert | 29/243.57 |
| 3,793,688 | 2/1974 | Keating et al. | 29/243.57 |

FOREIGN PATENT DOCUMENTS

| | | |
|---|---|---|
| 130671 | 8/1901 | Fed. Rep. of Germany . |
| 1511725 | 11/1964 | Fed. Rep. of Germany . |
| 1552566 | 11/1968 | France . |
| 768490 | 2/1957 | United Kingdom . |
| 1104481 | 2/1968 | United Kingdom . |
| 1168877 | 10/1969 | United Kingdom . |
| 1179624 | 1/1970 | United Kingdom . |
| 1311443 | 3/1973 | United Kingdom . |
| 1317601 | 5/1973 | United Kingdom . |
| 1330739 | 9/1973 | United Kingdom . |
| 1349298 | 4/1974 | United Kingdom . |
| 1358643 | 7/1974 | United Kingdom . |
| 1358944 | 7/1974 | United Kingdom . |
| 1361142 | 7/1974 | United Kingdom . |

*Primary Examiner*—James L. Jones, Jr.
*Attorney, Agent, or Firm*—Allegretti, Newitt, Witcoff & McAndrews

[57] ABSTRACT

An improved clip attachment apparatus includes a main drive cylinder operative to drive a punch against a clip. A mechanical linkage also connects the drive cylinder with a gate. Operation of the main drive cylinder simultaneously closes the gate to form the punch channel and drives the punch. The mechanical linkage includes a lost motion feature to insure that the gate will be closed prior to attachment of the clip around material gathered at the lower end of the punch channel. An improved knife for cutting the clipped material and an improved pneumatic circuit for sequentially controlling the drive cylinder and the knife cylinder are disclosed. Finally, an adjustable trigger mechanism for initiating operation of the clipper is disclosed.

20 Claims, 10 Drawing Figures

FIG.6
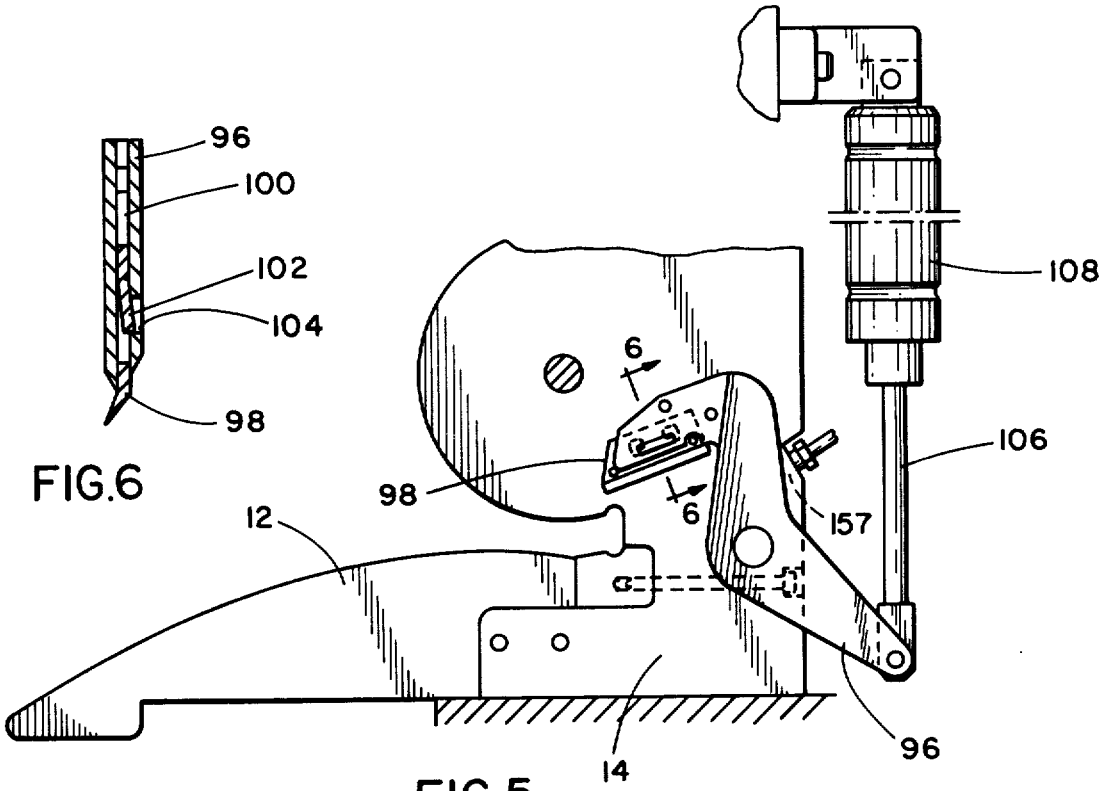
FIG.5
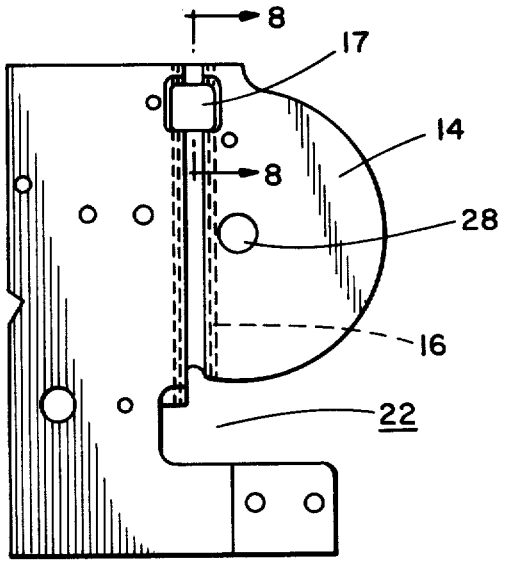
FIG.7
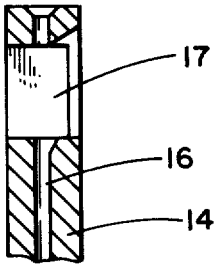
FIG.8

SINGLE PISTON OPERATED CLIP DEVICE

Matter enclosed in heavy brackets [ ] appears in the original patent but forms no part of this reissue specification; matter printed in italics indicates the additions made by reissue.

BACKGROUND OF THE INVENTION

This invention relates to an improved clipper mechanism and more particularly to a clipper mechanism of the type wherein a main drive cylinder is utilized to simultaneously close the channel gate and drive the clip punch.

In the past, various patents have disclosed structure which provides a punch mechanism for driving a clip subsequent to gathering of material to be clipped and formation of a clip channel by a gate member. Such clipper mechanisms gather material to be clipped and hold the material in proximity to a clip die positioned in the path of travel of a clip driven by a punch. The material gathering and displacement mechanism is generally a gate operated by an air cylinder. As the gate gathers the material, it simultaneously completes formation of a channel for the clip.

A separate air cylinder generally operates the punch which drives the clip about the gathered material. Typical prior art patents disclosing such structure include Tipper, U.S. Pat. No. 3,394,528, U.S. Pat. No. 3,543,378 and U.S. Pat. No. 2,880,419.

As state above, the known prior art patents disclose formation of the channel for guiding the clip by closure of a gate which is effected by a mechanical or manually operated gate control mechanism separate from the drive mechanism for the clip punch. Such prior art apparatus does not generally disclose a mechanical linkage connecting a channel forming gate and a clip punch with the same drive cylinder. The present invention, however, provides such an apparatus.

SUMMARY OF THE INVENTION

In a principal aspect then, the present invention comprises an improved clipper apparatus of the type actuated by a fluid cylinder wherein a channel is formed for receipt of the clip by various channel forming members including a gate. A clip driving punch is driven by the fluid cylinder and, in turn, drives the clip through the channel about gathered material at the end of the channel. Additionally, a direct mechanical linkage is provided between the main drive cylinder and the channel forming gate. The linkage operates the gate in response to operation of the drive cylinder.

A control circuit for the apparatus and the optional cut-off knife is also disclosed. The unique knife includes a removable blade and provides more positive cutting action for gathered material relative to known prior art.

It is thus an object of the present invention to provide an improved clipper apparatus and, more particularly, a clipper apparatus of the type for attaching a clip about gathered material. The apparatus of the invention includes a gate and material gathering structure which also defines a punch and clip channel.

Another object of the present invention is to provide an improved clipper mechanism actuated by a single main drive cylinder.

Another object of the present invention is to provide an improved fluid control mechanism for operation of a clipper mechanism and, in particular, the main drive cylinder of a clipper mechanism.

Still another object of the present invention is to provide a clipper mechanism which provides sequential operation of a gathering and displacement gate mechanism and associated punch in response to actuation of a single main drive cylinder.

These and other objects, advantages and features of the present invention will be set forth in greater detail in the description which follows.

BRIEF DESCRIPTION OF THE DRAWING

In the detailed description which follows, reference will be made to the drawing comprised of the following figures:

FIG. 5 is an enlarged perspective view of the cutting knife associated with the clipper apparatus of the present invention;

FIG. 6 is a cross-sectional view of the cutting blade associated with the cutting knife taken along the line 6—6 in FIG. 5;

FIG. 7 is a view of the channel forming member of the clipper of the present invention; and FIG. 8 is an enlarged cross-sectional view of the channel in the channel forming member taken along the line 8—8 in FIG. 7 and illustrating the opening for ingress of clips to the channel for engagement by the punch.

DESCRIPTION OF THE PREFERRED EMBODIMENT

Figure 1:
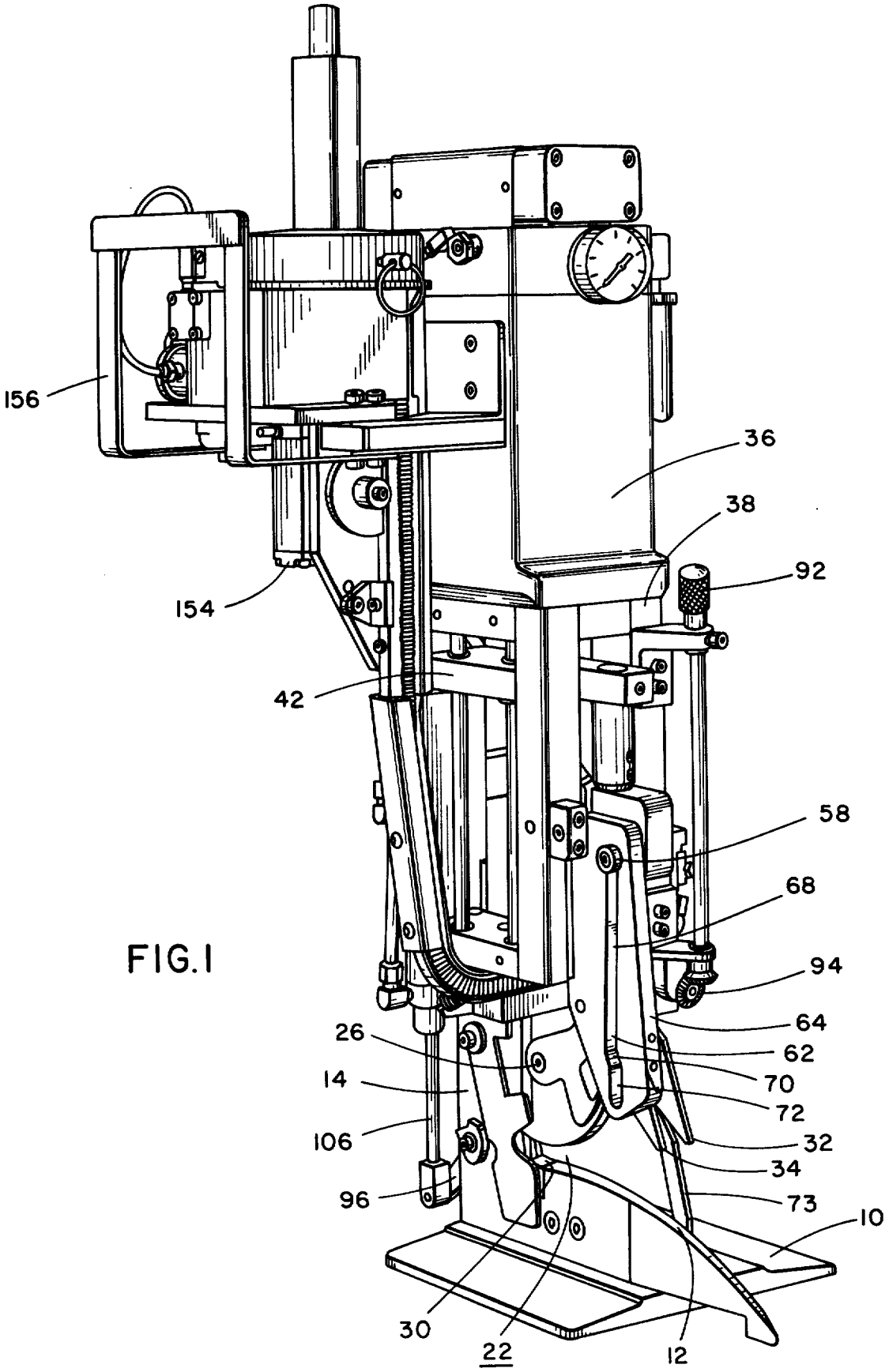
FIG. 1 is a front perspective view of the improved clipper apparatus or clipper of the present invention in combination with a clip feed mechanism.

Referring to FIG. 1, the improved clipper apparatus of the present invention includes a bracket assembly comprised of a lower support plate 10 with a guide 12 mounted thereon. A C-shaped die support 14 defined by a vertical plate is attached to the guide 12 and extends upwardly from plate 10. As illustrated in FIGS. 3 and 7, the die support 14 includes a grooved channel 16 for receipt of a punch 18 and clip 20. The punch 18 drives clip 20 downward in channel 16 against a die or anvil 30.

Figure 2:
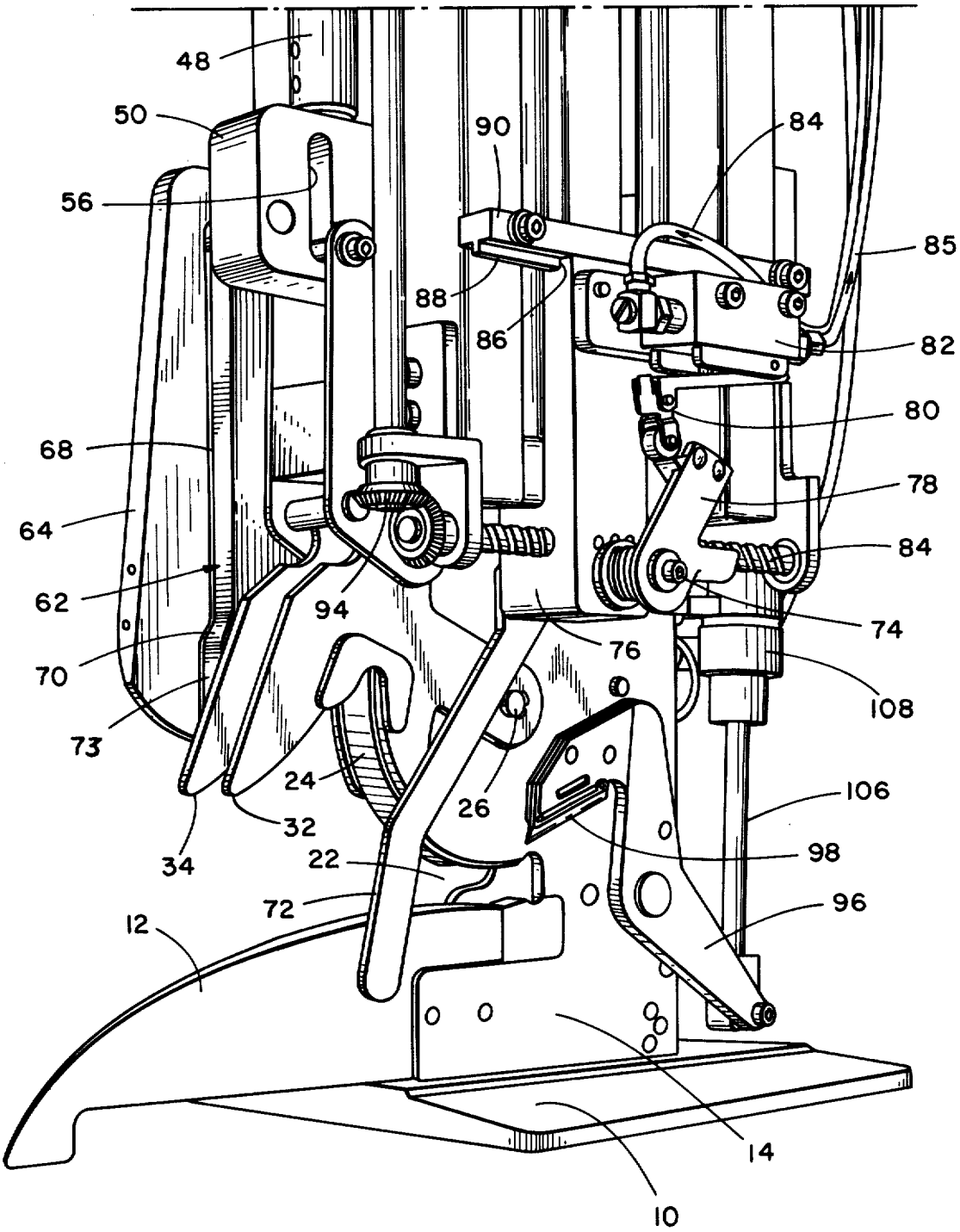
FIG. 2 is an enlarged perspective view of the mechanical linkage and gate mechanism as well as the trigger mechanism associated with the improved clipper apparatus of the present invention.
Figure 3A:
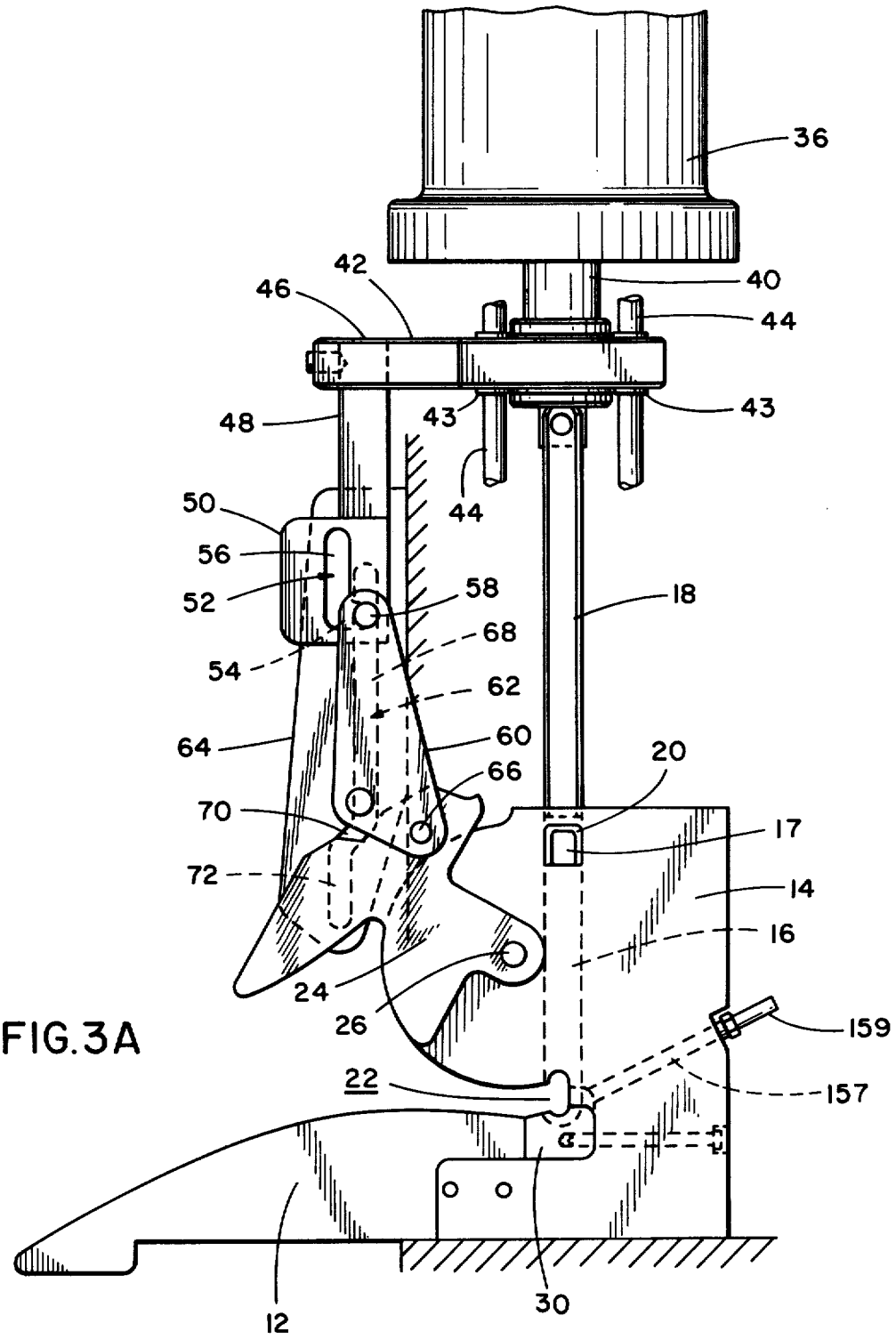
FIG. 3A is an enlarged partially schematic view of the lost motion linkage and punch drive linkage in the full upright or retracted position.
Figure 3B:
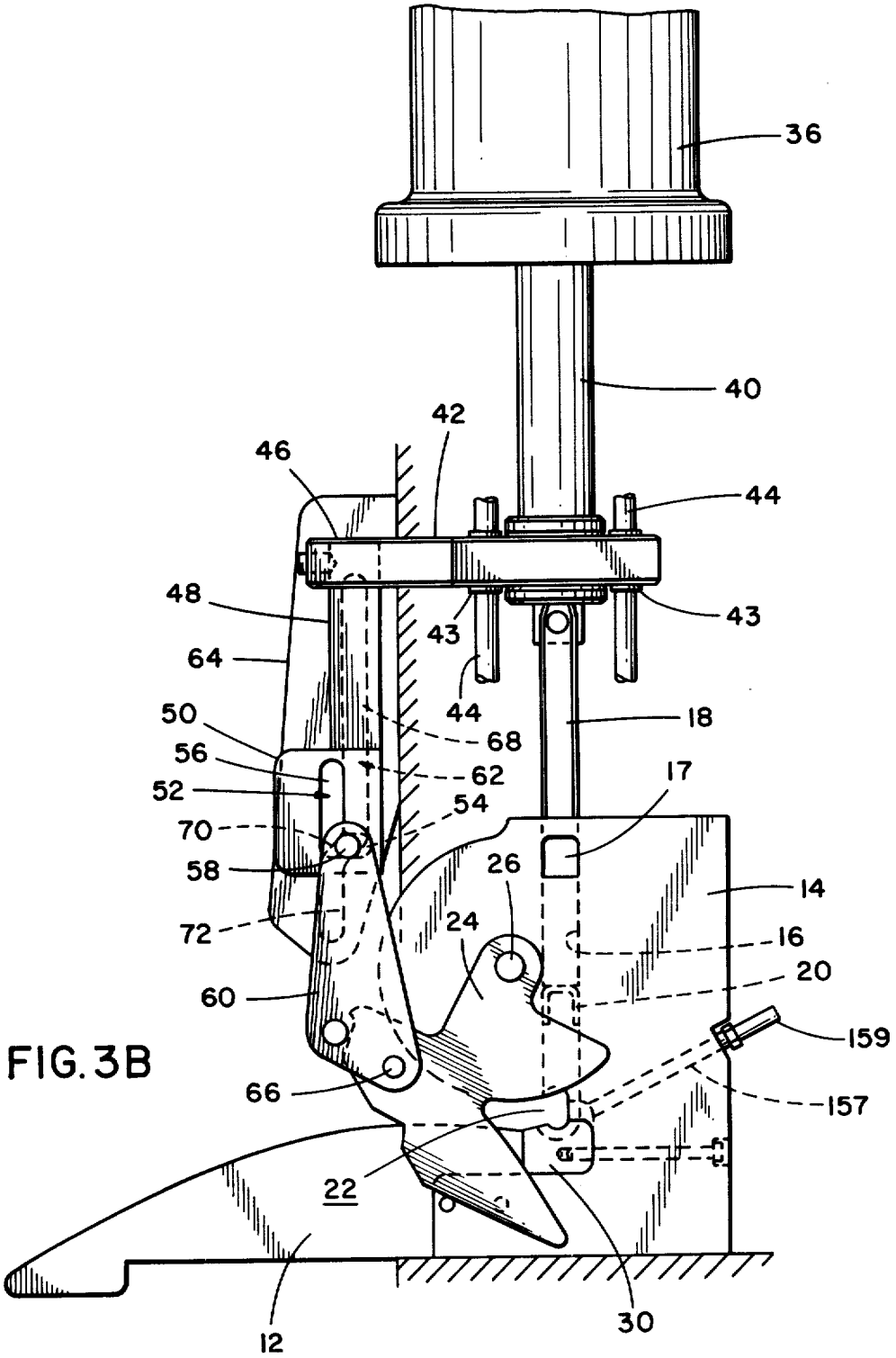
FIG. 3B is a view similar to FIG. 3A wherein the main drive cylinder has projected the punch partially toward to the fully extended position.
Figure 3C:
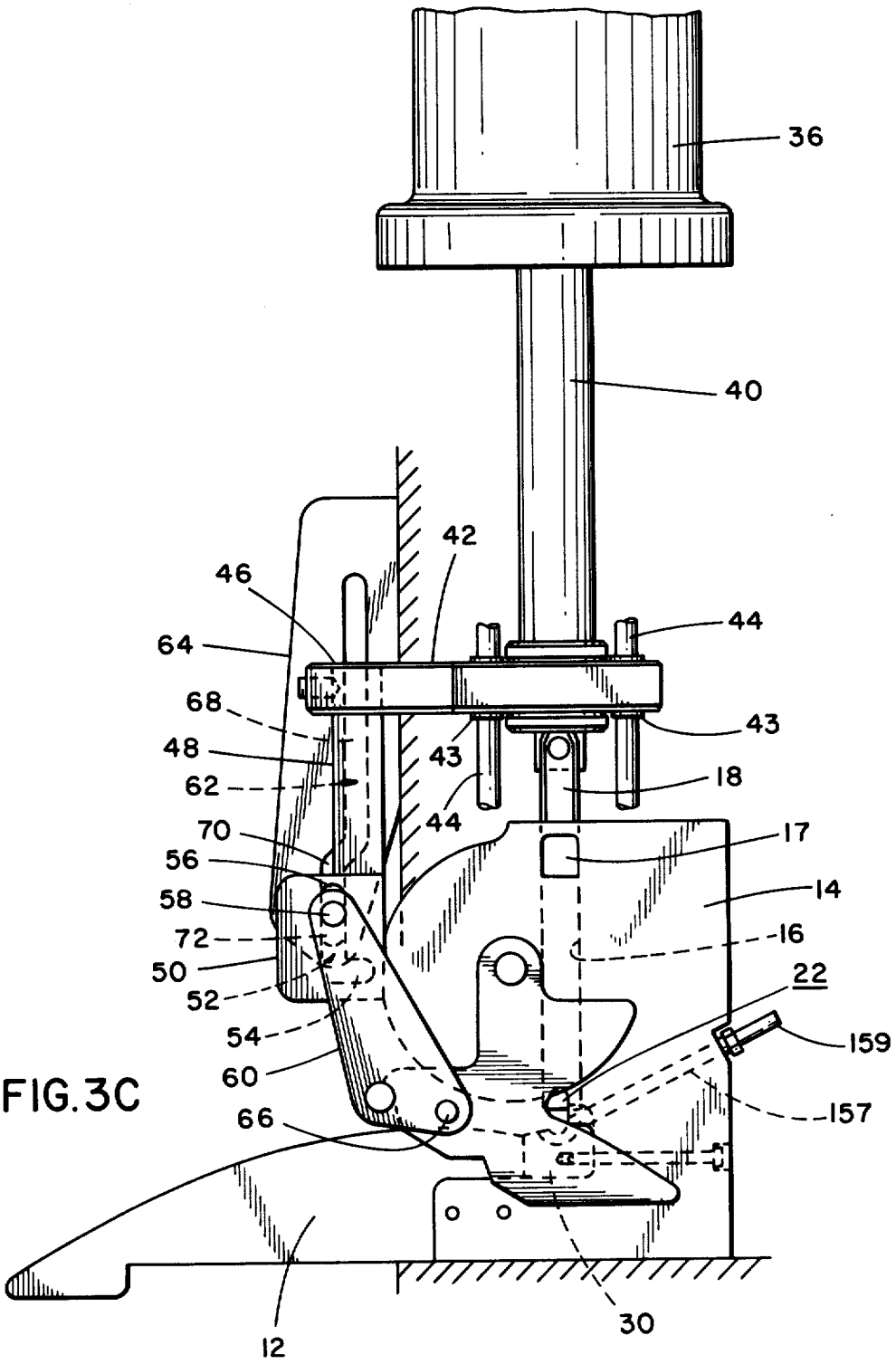
FIG. 3C is similar to FIGS. 3A and 3B and illustrates further extension of the main drive cylinder to the fully extended position.

The die support 14 is C-shaped an thus defines a throat opening 22 for receipt of gathered material about which the clip 20 is to be placed. A gate 24 is pivotally attached by means of pin 26 through opening 28 to the die support 14. The gate 24 may thus be rotated to close the throat opening 22 and complete the grooved channel 16 as shown in FIG. 3C. Alternatively, the gate 24 may be rotated to its full open position as illustrated in FIGS. 2 and 3A for admission of material to the throat opening 22.

The die 30 is positioned in support 14 adjacent the lower end of channel 16 in the manner known to those skilled in the art. The die 30 thus cooperates with the legs of a clip 20 to form those legs about material maintained in the throat opening. The general method of clip 20 formation is also known to those skilled in the art.

First and second side gathering plates 32 and 34 are attached to the opposite sides of the gate 24. Plates 32, 34 assist in gathering and positioning material placed in the throat opening 22 prior to attachment of a clip 20 thereto. The apparatus thus far described is generally known to those skilled in the art.

Unitary Drive for Gate and Punch

A single main drive cylinder 36 is mounted on a bracket assembly 38 attached to the die support 14. The main cylinder 36 includes a projecting rod 40 extending from piston 122 in FIG. 4, thereby defining a stroke of the clipper. When the rod 40 is in the position illustrated in FIG. 3A, the clipper is in a retracted position. Extending the rod 40 to the position shown in FIG. 3C, places the clipper in a fully projected or extended position. Actuation of the drive cylinder 36 and thus extension of the rod 40 causes punch 18 to be driven through grooved channel 16 against a clip 20. Thereby, the clip 20 is formed against the die 30 and closes about material gathered in the throat opening 22 by the gate 24 and gathering plates 32 and 34.

Rod 40 is connected to a platen 42. Platen 42 is maintained in proper alignment by means of bushings 43 slidable on guide rods 44 fixed to the bracket assembly 38. Punch 18 is then attached to the opposite side of platen 42 and moves in response to movement of platen 42 with respect to fixed guide rods 44.

Platen 42 includes an outward extension 46 having a downwardly projecting post 48 attached thereto and movable therewith. Attached to the lower end of the post 48 is a cam actuator 50. The cam actuator 50 includes a cam track 52 having a horizontal first run 54 and a vertical second run 56. A follower or link pin 58 attached to one end of a link 60 is positioned in the track 52 and projects into a cam slot 62 in a cam plate 64 attached to the bracket assembly 38. The follower or link pin 58 thus simultaneously follows the path defined by both cam track 52 and cam slot 62.

The opposite end of link 60 is pivotally attached by pin 66 to the gate 24. Thus, the cam actuator 50, link 60 and gate 24 move in response to movement of platen 42. The movement imparted to the gate 24 is pivotal motion about pin 26. When the rod 40 is in its retracted or unextended position, the gate 24 is open as illustrated in FIG. 3A. When the rod 40 is in its extended position, the gate 24 is closed as illustrated in FIG. 3C. FIG. 3B illustrates an intermediate position of the platen 42 through the gate 24 has been almost fully rotated to a closed position.

Note that the relationship of track 52, slot 62 and follower 58 provides a lost motion action at the lower end of the stroke of rod 40. Thus, as the rod 40 is initially extended from the position of FIG. 3A, follower 58 is maintained in first run 54 due to the cooperation of upper portion 68 of slot 62 on follower 58. As the rod 40 is extended to the position illustrated by FIG. 3B, the follower 58 is caused to travel from the first run 54 to the second run 56 of track 52 by action of segment 70 of cam slot 62 on follower 58. Segment 72 of cam slot 62 maintains the follower 58 within the second run 56 of slot 52. Segment 70 is an intermediate inclined segment of slot 62 and thus provides a gradual transition from run 54 to run 56. Segment 70 is preferably inclined from the horizontal and may be constructed to define the lower end of slot 62 as discussed below.

When the follower 58 is in the second run 56, no further rotational motion is imparted by movement of platen 42 to the gate 24. In other words, any additional motion is accounted for by movement of follower 58 within second run 56. Note that slot 62 may include a lower segment 72 which accommodates the lost motion action. Alternatively, the inclined segment 70 is designed to define the lower termination point of follower 58 in slot 62. Follower 58 will then bottom at the end of segment 70 and remain in fixed position pending reversal of stroke of piston 122.

In this manner, the rod 40 may be extended to its full projected position, thereby fully actuating punch 18 subsequent to complete closing of gate 24. In other words, the gate 24 is initially and sequentially rotated into proper closed position (as shown in FIG. 3B) prior to driving a clip 20 tightly about gathered material in the throat opening 22. Initial closing of gate 24 is necessary to form channel 16 for clip 20.

As discussed, a single main drive cylinder 36 is utilized to operate both the punch 18 and gate 24. Both punch 18 and gate 24 are positively driven and positively withdrawn by operation of cylinder 36. That is, upon reversing the stroke of the main cylinder 36, the punch 18 is initially withdrawn. Subsequently, the gate 24 is positively rotated in the opposite direction to assume the position illustrated by FIG. 3A.

Trigger Adjustment

Referring now to FIG. 2, some additional important features of the improved clipper of the present invention are illustrated. As shown in that figure, a trigger 73 is attached to a rocker shaft 74 pivotally mounted on a trigger bracket 76. A lever arm extension 78 attached to the opposite end of shaft 74 is positioned to engage a limit switch arm 80 associated with an air limit switch or valve 82. Valve 82 includes an air inlet line 84 and an air outlet valve 86, the function of which will also be described in further detail with reference to FIG. 4 below.

Rotation of the lever arm extension 78 will actuate valve 82. Lever arm extension 78 is rotated in response to movement of trigger 73 in the counterclockwise direction in FIG. 2. This occurs whenever material to be clipped is placed within the throat opening 122 by an operator. For example, a plastic bag which is to be clipped would be pushed into the throat opening and, upon doing this, would also engage the trigger 73, thereby actuating the valve 82.

The trigger bracket 76 is mounted on a lead screw 84. The opposite end of the bracket 76 includes a slot 86 which is engaged with a flange 88 on a fixed bracket 90. A trigger adjustment knob 92 in FIG. 1 is mounted on the bracket assembly 38 and operates bevel gears 94 to thereby rotate lead screw 84. The lead screw upon rotation will move the trigger bracket 76 forward or backward depending upon the sense of rotation. In this manner, the trigger 73 is placed forward or back in the throat opening 22 and the triggering mechanism for the pneumatic circuitry described below can be adjusted.

Knive Cut-Off Construction

FIGS. 2, 5 and 6 illustrate the knife cut-off mechanism associated with the improved clipper of the present invention. A knife support member 96 is pivotally attached to the die support 14. A knife blade 98 is removably inserted in a slot 100 provided. The blade 98 includes a spring member 102 which fits in an opening 104 of member 96 to retain the blade 98. Consequently, the blade 98 is removable upon flexure of the spring portion 102 from locking engagement with opening 104.

The opposite end of knife support member 96 is attached to a rod 106 extending from a knife operating cylinder 108. To operate the knife blade 98, the rod 106 is retracted thereby rotating the knife support 96 in the counterclockwise direction as illustrated in FIGS. 2 and 5. This causes the knife blade 98 to pass adjacent the throat opening 22 and the die 30, thereby cutting off any material projecting beyond the die 30.

Method of Operation and Control Circuit

Figure 4:
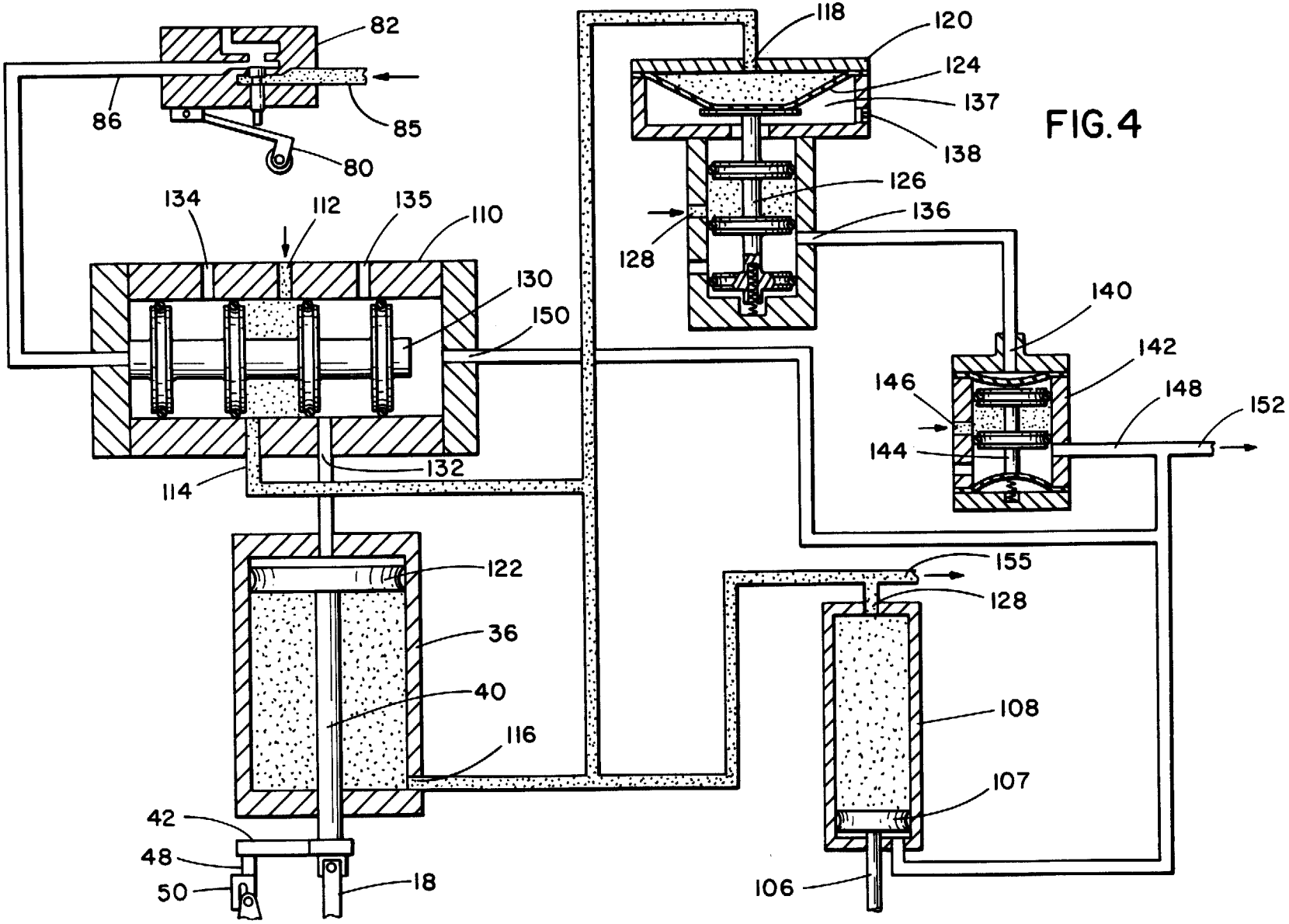
FIG. 4 is a schematic view of the pneumatic control circuit for the clipper of the present invention.

Referring now to FIG. 4, the method of operation of the improved clipper of the present invention will be described. As previously recited, valve 82 controls the initiation of operation of the clipping mechanism. Valve 82 is a control valve and provides an output through line 86 to a main pilot valve 110. When valve 82 is in the closed position, illustrated in FIG. 4, pressurized air passes through input 112 of main pilot valve 110 and through outlet 114. Pressurized fluid through the line 114 or the first main outlet of the pilot valve 110 is directed in parallel fashion to inlet 116 of main drive cylinder 36 and to inlet 118 of the diaphragm pilot valve 120.

Pressure through inlet 116 acts against the lower side of piston 112 of main drive cylinder 36, thereby maintaining rod 40 in a retracted position as illustrated. Pressure through inlet 118 of diaphragm valve 120 acts on diaphragm 124 and valve member 126 so that pressurized fluid to the inlet 128 of valve 120 is not directed to any outlet. The outlet 114 is also connected to the inlet 128 of knife cylinder 108. Pressure acts on piston 107 and maintains the rod 106 of knife cylinder 108 in a projected position as illustrated in FIGS. 4 and 5.

Upon actuation of arm 80 to open valve 82, pressurized fluid passes through line 86 and shifts valve member 130 of valve 110 to the right. Upon transfer of the valve member 130, pressurized air through inlet 112 then passes to the second outlet 132. First outlet 114 is now exhausted through exhaust outlet 134. Thus, the lower side of piston 122 is exhausted. Similarly, the top side of piston 107 associated with rod 106 is exhausted. Pressure is also released from the top side of diaphragm 124 associated with valve 120.

When the fluid pressure is provided through the second outlet 132, the piston 122 and associated rod 40 are immediately driven toward the extended position. The operation of the punch 18 and gate 24 in response to movement of rod 40 is effected as previously described.

After some time delay, the valve member 126 shifts upward from the position illustrated in FIG. 4 so that air pressure through inlet 128 may pass through outlet 136. This time delay is provided as a result of orifice 138 which permits air to leak into chamber 137 on the bottom side of diaphragm 124 at a slow rate thereby preventing immediate snap action of valve member 126. Preferably, the size of the orifice 138 is adjustable in order to set the time delay of valve member 126. This time delay is necessary in order to delay operation of the knife cylinder 108 until a clip 20 has been successfully attached to gathered material.

Subsequent passage of pressurized air from outlet 136 to inlet 140 of knife control valve 142 causes valve member 144 to be shifted permitting pressurized air from inlet 146 to pass through outlet 148. Pressurized air through the outlet 148 acts on lower side of piston 107, thereby retracting rod 106 and operating the knife blade 98.

The outlet 148 is also connected with pilot inlet 150 of valve 110 causing the pilot valve member 130 to be shifted back toward the original position illustrated in FIG. 4. Shifting of valve member 130 thereby automatically reverses the operation since second outlet 132 then is exhausted through exhaust port 135.

Note that additional lines as at line 152 may be provided to effect further operations. For example, line 152 may be directed to a clip feeding assembly 154 in FIG. 1 or a clip advance mechanism 156 in FIG. 1. Also, additional lines may be included in parallel with the first outlet 114. For example, line 155 may be connected through a conduit to a clip blow out passage 157 in FIGS. 3A and 5. Such a clip blow out passage 157 provides air directly to the face of the die 30 to clean off the die face prior to attachment of additional clips.

While in the foregoing there has been set forth a preferred embodiment of the present invention, it is to be understood that the invention shall be limited only by the scope of the following claims and their equivalents.

What is claimed is:

1. An improved clipper mechanism comprising in combination:

a. a bracket assembly including fixed punch guide means defining a portion of a punch and clip guide channel, clip feed means for feeding a clip into the channel, and die means at one end of said channel for forming a clip cooperatively with punch means;

b. reciprocal punch means mounted in the fixed punch guide means for travel in the channel between a retracted position and an extended, clip attachment position;

c. drive means for driving said punch means reciprocally between the retracted and extended positions, said drive means mounted on the bracket assembly;

d. gate means attached to the assembly for cooperation with the punch guide means to form a complete closed channel to guide a clip into cooperation with the die means, [and] *said* gate means being removable from cooperation with the punch guide means forming the channel to define a throat opening for positioning material to be clipped over the die means; and e. mechanical linkage means connecting the gate means with the drive means for retracting the gate means from cooperation with the punch guide means to expose the throat opening when the punch means are in the retracted position and for closing the gate means to form a continuous, closed channel for said clip and punch means upon operation of the drive means to transport the punch means toward the extended position [.], *said mechanical linkage means including*

*(i) a fixed cam plate attached to the bracket assembly, said cam plate including a cam slot;*

*(ii) an actuator member attached to the drive means and movable reciprocally therewith, said actuator including cam track overlying portions of the cam slot; and*

*(iii) a link pivotally attached to the gate means at one end and including a follower at the opposite end, said follower simultaneously cooperating with the cam slot and cam track.*

2. The improved clipper of claim 1 wherein said gate means comprise a gate pivotally attached to the bracket assembly for pivotal motion about an axis intermediate the ends of the channel.

[3. The improved clipper of claim 1 wherein said mechanical linkage means includes a cam and follower mechanism driven by the drive means, and providing a rotational movement to close said gate means upon the corresponding movement of the punch means toward the extended position.]

4. The improved clipper of claim 1 wherein said drive means comprise fluid actuated drive means.

5. The improved clipper of claim 1 including knife means attached to said bracket assembly for cutting material extending through the throat opening.

6. The improved clipper of claim 5 wherein said knife means comprises a knife member pivotally attached to the bracket assembly adjacent the throat opening and means for actuating the knife member by driving said knife member about its pivot axis to intersect material projecting through the throat opening.

7. The improved clipper of claim 5 wherein said knife means comprises a knife holder and a knife blade removably inserted in said holder.

8. The improved clipper of claim 6 wherein said means for actuating said knife includes a fluid drive means.

9. The improved clipper of claim 1 wherein said drive means comprise a main fluid cylinder for directly driving the punch means and for operating the gate means.

10. The improved clipper of claim 1 including control means for said drive means.

11. The improved clipper of claim 10 wherein said control means comprise a lever actuated valve, said lever being responsive to placement of material in the throat opening to open said valve and direct fluid to the drive means.

12. The improved clipper of claim 1 including knife means attached to the bracket assembly;

fluid actuated knife operating means for actuating said knife to cut material projecting from the throat opening; and wherein said drive means is fluid actuated.

13. The improved clipper of claim 12 including control means for sequentially operating said fluid actuated knife operating means and said fluid actuated drive means.

14. The improved clipper of claim 13 including a single fluid pressure input for actuating the drive means and the knife means.

15. The improved clipper of claim 14 including time delay means for said single fluid pressure input for the knife means.

16. The improved clipper of claim 10 wherein said control means is adjustable.

17. The improved clipper of claim 1 wherein the gate means includes a gate member for forming the channel and at least one side plate member for gathering and maintaining material in the channel.

18. An improved clipper mechanism comprising, in combination:

a. a bracket assembly including a fixed punch guide defining a portion of a punch and clip guide channel, clip feed means for feeding a clip into the channel, and a die at one end of the channel for forming a clip cooperatively with a punch;

b. a punch mounted in the punch guide for travel in the channel between a retraced position and an extended clip attachment position;

c. fluid drive means mounted on the bracket assembly and attached to the punch for driving the punch reciprocally between retracted and extended positions;

d. a channel gate pivotally attached to the bracket assembly and forming, at least in part, the end of the channel adjacent the die when pivoted to a closed position, said channel gate being pivotal away from the channel to provide a throat opening for material to be clipped; and e. a mechanical linkage connecting the fluid drive means with the gate for pivotally moving the gate to the closed position prior to movement of the punch to the fully extended position[.], *said mechanical linkage means including:*

*(i) a fixed cam plate attached to the bracket assembly said cam plate including a cam slot,*

*(ii) an actuator member attached to the drive means and movable reciprocally therewith, said actuator including a cam track overlying portions of the cam slot; and*

*(iii) a link pivotally attached to the gate means at one end and including a follower at the opposite end, said follower simultaneously cooperating with the cam slot and cam track.*

19. The clipper of claim 18 wherein the linkage includes a movable platen attached to the drive rod, said platen being attached to the gate by the linkage and to the punch.

20. The clipper of claim 18 wherein the linkage and the punch have equal strokes imparted by the drive means, and wherein said linkage includes means for lost motion at the end of said stroke whereby said gate is rotated into closed position and maintained in closed position by a partial stroke and said punch is moved to the extended position by a full stroke.

21. The clipper of claim 20 wherein said means for lost motion includes a link connecting the gate and the linkage, said link being pivotally connected to the linkage and the gate, said link having a pivot pin at the end connected to the linkage and mounted in a slot in the linkage, said slot including a run transverse to the direction of stroke and a second run parallel to the direction of stroke, and means for placing the pin in the second run to provide lost motion.

* * * * *